March 1, 1949.   H. A. KNOX   2,462,873
SUSPENSION UNIT
Filed June 1, 1945   2 Sheets-Sheet 1
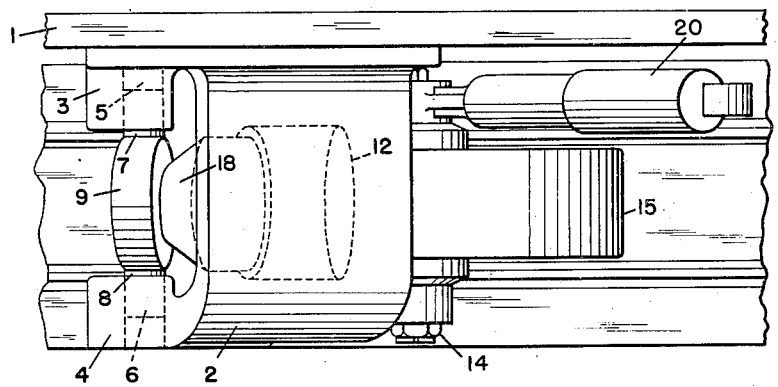
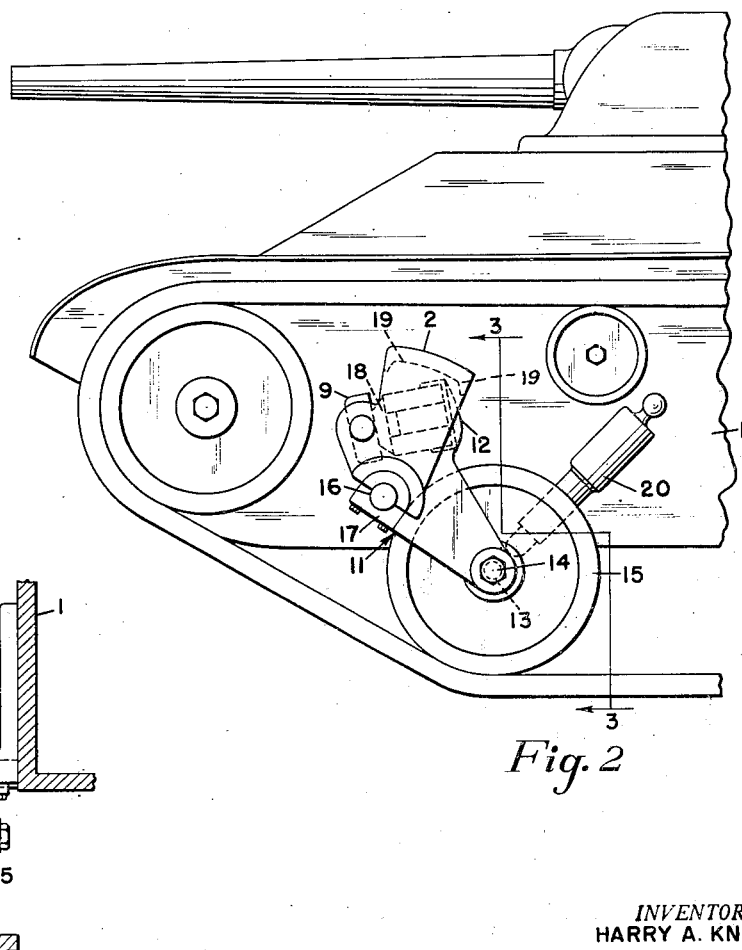
INVENTOR.
HARRY A. KNOX
BY
C. E. Herrstrom & H. E. Thibodeau
ATTORNEYS March 1, 1949.  H. A. KNOX  2,462,873
SUSPENSION UNIT
Filed June 1, 1945  2 Sheets-Sheet 2

INVENTOR.
HARRY A. KNOX
BY C. E. Herrstrom &
H. E. Thibodeau
ATTORNEYS

Patented Mar. 1, 1949

2,462,873

UNITED STATES PATENT OFFICE 2,462,873

SUSPENSION UNIT

Harry A. Knox, Washington, D. C.

Application June 1, 1945, Serial No. 597,053

3 Claims. (Cl. 280—106.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to suspension units, and, more particularly, to suspension units for heavy combat vehicles; such as, tanks, tractors and the like.

It has heretofore been necessary where double tracks have been used on a heavy vehicle to remove all of the wheels and the suspension units as a whole, thereby making it a very difficult operation. Tire suspension units with volute springs have had a tendency to have the volute spring housing filled up with dirt, debris and the like, thereby reducing the efficiency of the suspension system. No means has heretofore been provided to easily add an additional track and suspensions therefor where greater flotation is desired.

It is, accordingly, an object of my invention to overcome the above and other defects in present types of suspension systems, and it is, more particularly, an object of my invention to provide a suspension system which is simple and rugged in construction, which has a minimum of wearing parts, which is economical in cost, which is easy to assemble and disassemble and which is efficient in operation.

Another object of my invention is to provide a suspension unit which may be made up as the entire suspension system or which may be used in conjunction with or as a supplement to other types of suspension units where springing action is relatively severe.

Another object of my invention is to provide a suspension wherein an additional track may be attached and detached in a very simple manner, and this may be done without disturbing the inside tracks and suspensions.

Another object of my invention is to provide a suspension system for a heavy vehicle wherein two tracks are used on each side of the vehicle and in which the outer of the tracks may be removed in shipment of the vehicle.

Other objects of my invention will become evident from the following detailed description, taken in conjunction with the accompanying drawings, in which:

Figure 1 is a plan view of my novel suspension unit used in a single track vehicle;

Figure 2 is a side elevational view of my novel suspension unit installed on a track vehicle;

Figure 3 is a view taken on the line 3—3 of Figure 2;

Figure 4:
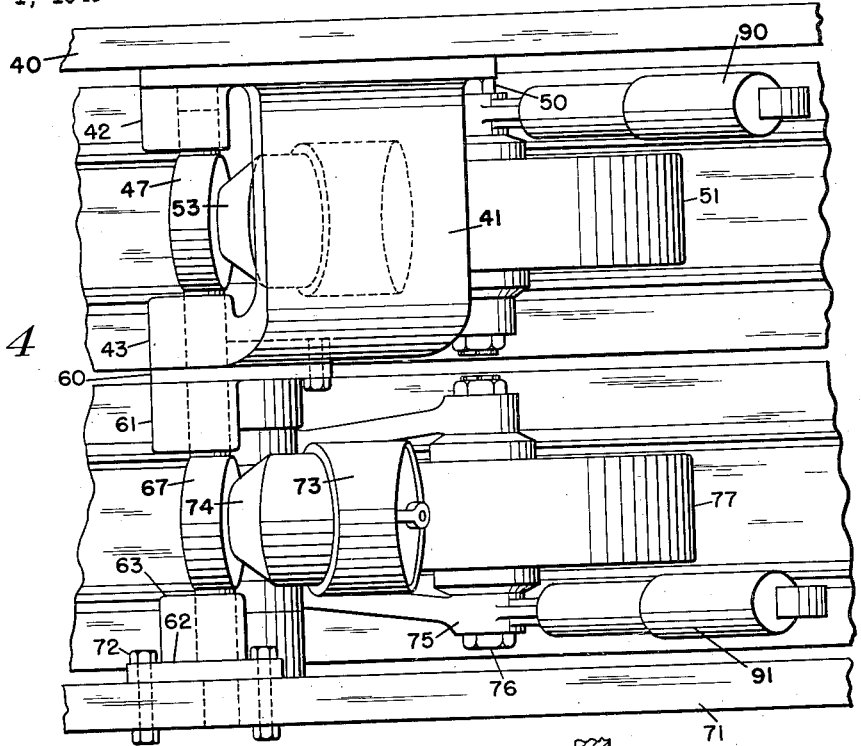
Figure 4 is a plan view of my novel suspension unit used in a two track vehicle construction.

Referring now to the drawings, Figures 1, 2 and 3 show a single track suspension unit comprising a hull or frame 1 of a tank vehicle to which is attached by any suitable method, such as welding, a bracket 2 having bosses 3 and 4 with apertures 5 and 6 for receiving the end bearing portions 7 and 8 for a pressure plate 9. A bell crank member 11 has a volute spring housing 12 on the upper end thereof and an aperture 13 in the lower arm thereof for receiving a shaft 14 carrying a wheel 15. The bell crank 11 is pivoted on shaft 16 which is supported in split bearings 17 on the bottom side of the bracket 2. A volute spring 18 is disposed in the volute spring housing 12 with the small end thereof abutting against and supported by the pressure plate 9. A hydraulic shock absorber 20 is pivotally connected on the shaft 13 and may be used, if desired, although it is not necessary for the operation of my novel suspension unit.

In operation, when the wheel 15 is bumped or moved upwardly, the bell crank shaped member 11 pivots around the shaft 16 thereby forcing the volute spring 18 in the housing 12 against the pressure plate 9 and compressing the volute spring. When the wheel returns to its normal position or the spring 18 moves into a return direction, the spring 18 will resume normal position. A rib 19 on the bracket 2 limits the movement of the housing 12 of the bell crank 11.

Figure 5:
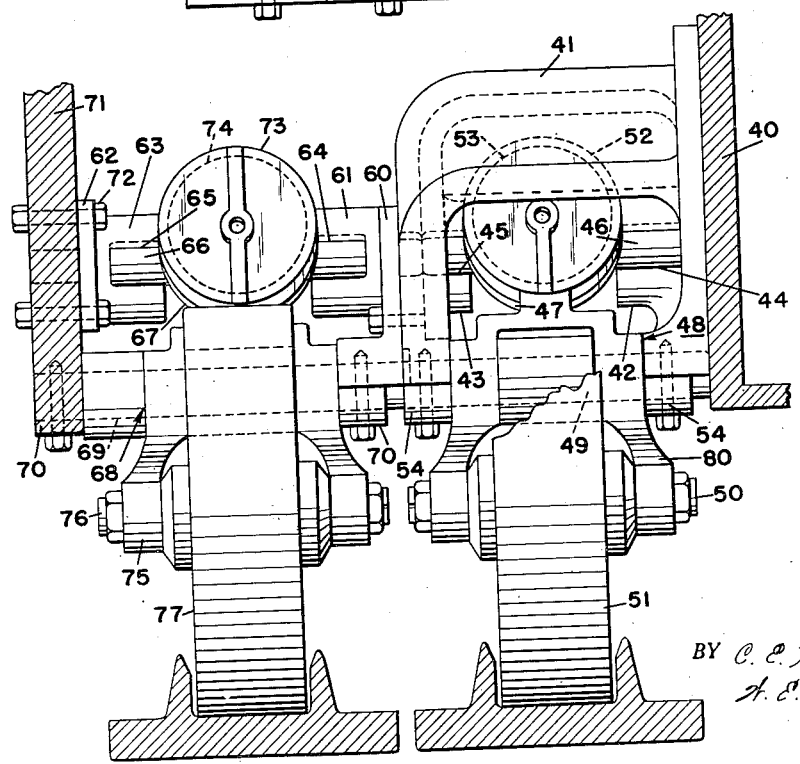
Figure 5 is a view taken from the rear side of my novel suspension unit shown in Figure 4.

A suspension unit for a double track vehicle is shown in Figures 4 and 5. It will be noted that the construction for the inner track of this unit is the same as the construction of the single track unit shown in Figures 1, 2 and 3. The only difference is that an additional suspension unit and wheel is added to the outside of the inner suspension unit and wheels. Referring now to Figures 4 and 5, 40 is a hull or frame of a heavy tank vehicle and 41 is a bracket attached to the frame 40 by any suitable means, such as welding. Bosses 42 and 43 have apertures 44 and 45 for receiving the shaft 46 carrying a pressure plate 47. A bell crank shaped member 48 is pivoted on a shaft 49 having a fork shaped bifurcated portion 80 for receiving a shaft 50 to carry a wheel 51 and the other end of the bell crank member has a housing 52 for a volute spring or the like 53. The volute spring 53 has the small end thereof engaged with the pressure plate 47. Shaft 49 is supported on the bottom of the bracket 41 by split bearings 54 bolted to the bottom of the bracket 41. The outer suspension unit comprises a bracket 60 with boss 61 and a bracket 62 with boss 63 having apertures 64 and 65 for receiving the shaft 66 of a pressure plate 67. A bell crank shaped member 68 is pivoted on a shaft 69 supported in split bearings 70 attached to the bottom of bracket 60 and an outer frame plate 71 by bolts 72. The upper part of the bell crank shaped member 68 comprises a volute spring housing 73 for receiving a volute spring 74, the smaller end of which is supported by and engageable with the pressure plate 67. The lower end of the bell crank shaped member 68 has a forked bifurcated portion 75 receiving a shaft 76 for carrying the wheel 77. Hydraulic shock absorbers 90 and 91 may be pivotally connected to the shafts 50 and 76 respectively to assist in the absorption of the shock to the vehicle from bumps, et cetera, although it will be quite evident that these are not necessary for the efficient suspension of the units by means of my novel suspension system.

In operation, my double track unit as shown in Figures 4 and 5 operates the same as the unit shown in Figures 1, 2 and 3 with the exception that there are two wheels 51 and 77, and each suspension unit therefor operates independently of each other. From inspection of the drawings, it will be seen that by removal of a few bolts, the outer suspension unit may be removed from the vehicle.

It will be evident from the foregoing that I have provided a novel suspension unit for a heavy tank vehicle or the like which provides a two track suspension unit in which the suspension unit of the outer track may be removed very quickly and easily, and I have further provided a suspension unit which is simple and rugged in construction, and which has a minimum of wearing parts, and which furthermore is self-cleaning in that the volute spring housing has the opening therein extending downwardly and all water, debris, dirt and the like flow outwardly therefrom.

Various changes may be made in the specific embodiment of my invention without departing from the spirit thereof, or from the scope of the appended claims.

What I claim is:

1. A suspension unit for a vehicle comprising, in combination, a supporting bracket adapted to be attached at one side thereof to the side frame of said vehicle, a bell crank shaped member supported for pivotal movement in and by said bracket and having an upwardly and a downwardly extending arm, said downwardly extending arm having a forked bifurcated portion receiving a wheel axle and wheel thereon, a spring housing rigid on an upper portion of said upwardly extending arm for movement with the latter, said spring housing being inclined from the horizontal and extending downwardly to an outer open end so that all water and dirt flow outwardly therefrom, a pressure plate pivotally mounted on a shaft in said bracket, a volute spring disposed in said spring housing through said open end thereof, said spring having its small end extending from said open end of said spring housing and engaging said pressure plate for yieldingly absorbing a load placed on said downwardly extending arm of said bell crank shaped member, and a rib on said bracket for limiting movement of said spring housing incident to pivotal movement of said bell crank shaped member.

2. In suspension mechanism for a vehicle using a double track between inner and outer side walls, inner and readily detachable outer suspension units disposable between said walls and comprising, in combination, an inner bracket adapted to be secured at one side thereof to said inner wall, an inner bell crank shaped member supported for pivotal movement on an inner shaft in and by said inner bracket, a readily detachable outer bracket secured at one side thereof to the other side of said inner bracket and adapted to be secured at its other side to said outer wall, an outer bell crank shaped member supported on an outer shaft in and by said outer bracket for pivotal movement independent of said inner bell crank shaped member and disposed laterally therefrom, each of said bell crank shaped members having an upwardly extending arm and a downwardly extending arm, a bogie wheel journaled on each said downwardly extending arm, inner and outer pressure plates pivotally mounted in the respective said inner and outer brackets for independent pivotal movement, a separate spring housing rigid on each said upwardly extending arm for movement with the latter, said spring housing being inclined from the horizontal and extending downwardly to an outer open end so that all water and dirt flow outwardly therefrom, and a separate volute spring disposed in each said spring housing through said open end thereof, each said spring having its small end extending from the open end of the respective spring housing and engaging the respective one of said inner and outer pressure plates for yieldingly absorbing a load placed on the respective said bogie wheel.

3. In suspension mechanism for a vehicle using a double track between inner and outer side walls, inner and readily detachable outer suspension units disposable between said walls and comprising, in combination, an inner bracket adapted to be secured at one side thereof to said inner wall, an inner bell crank shaped member supported for pivotal movement on a shaft in and by said inner bracket, a readily detachable outer bracket secured at one side thereof to the other side of said inner bracket and adapted to be secured at its other side to said outer wall, an outer bell crank shaped member supported on a shaft in and by said outer bracket for pivotal movement independent of said inner bell crank shaped member and disposed laterally therefrom, each of said bell crank shaped members having an upwardly extending arm and a downwardly extending arm, a bogie wheel journaled on each said downwardly extending arm, inner and outer pressure plates pivotally mounted in the respective said inner and outer brackets for independent pivotal movement, a separate spring housing rigid on each said upwardly extending arm for movement with the latter, each said spring housing being inclined from the horizontal and extending downwardly to on outer open end so that all water and dirt flow outwardly therefrom, a separate volute spring disposed in each said spring housing through said open end thereof, each said spring having its small end extending from the open end of the respective spring housing and engaging the respective one of said inner and outer pressure plates for yieldingly absorbing a load placed on the respective bogie wheel, and means carried by one of said brackets for limiting movement of the respective said spring housing incident to pivotal movement of the respective bell crank shaped member.

HARRY A. KNOX.

REFERENCES CITED

The following references are of record in the file of this patent:

UNITED STATES PATENTS

| Number | Name | Date |
|---|---|---|
| 897,270 | Chapin | Sept. 1, 1908 |
| 2,011,565 | Barnes | Aug. 20, 1935 |
| 2,218,634 | Best | Oct. 22, 1940 |
| 2,260,634 | Mullner | Oct. 28, 1941 |
| 2,315,421 | Heaslet | Mar. 30, 1943 |
| 2,323,919 | Knox | July 13, 1943 |
| 2,333,107 | Knox | Nov. 2, 1943 |

FOREIGN PATENTS

| Number | Country | Date |
|---|---|---|
| 136,049 | Great Britain | Dec. 11, 1919 |
| 808,204 | France | Nov. 6, 1936 |